P. E. BIRD.
Clothes-Line Reel.
No. 220,793. Patented Oct. 21, 1879.
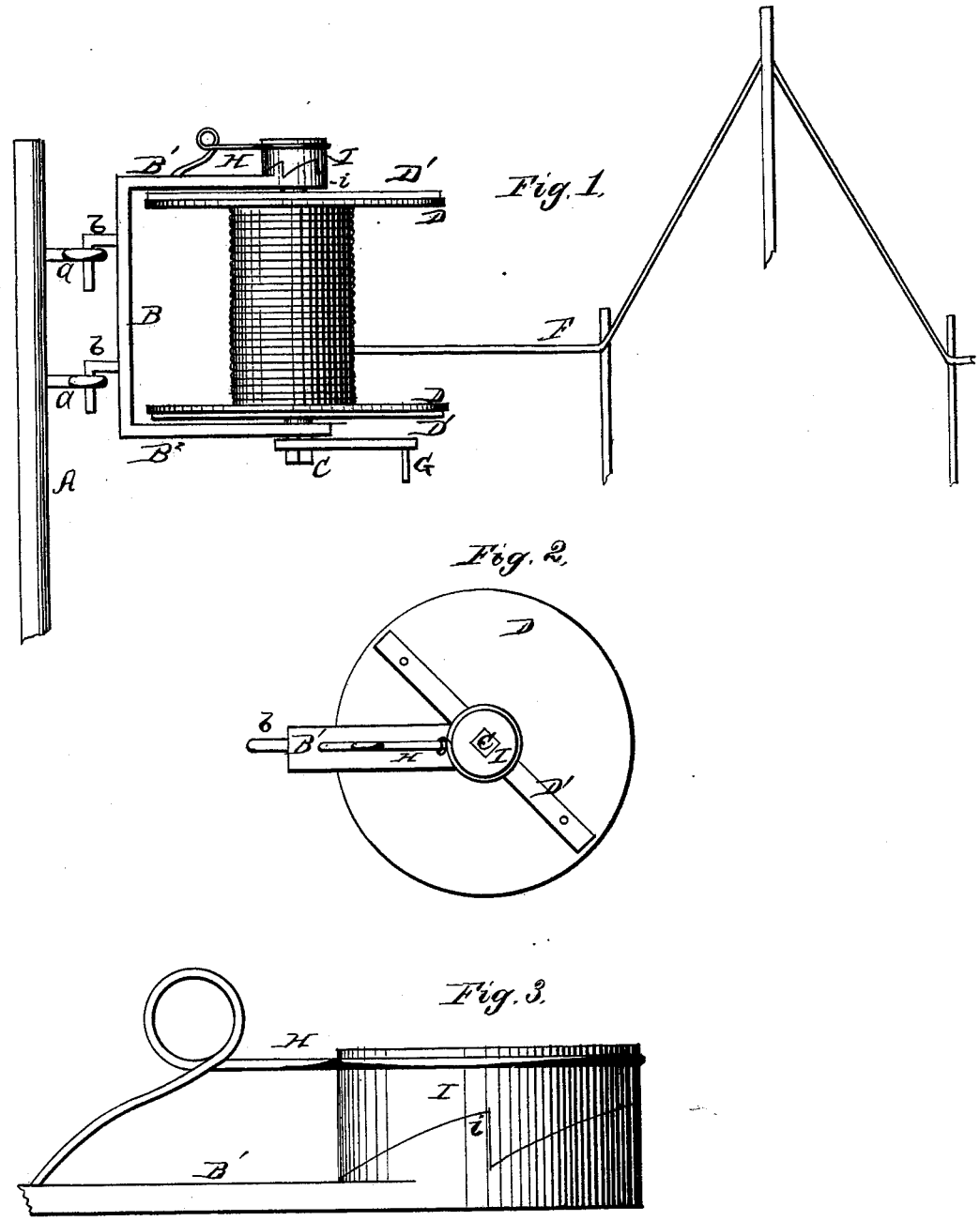

UNITED STATES PATENT OFFICE.

PETER E. BIRD, OF JENKINTOWN, PENNSYLVANIA.

IMPROVEMENT IN CLOTHES-LINE REELS.

Specification forming part of Letters Patent No. 220,793, dated October 21, 1879; application filed November 15, 1878.

*To all whom it may concern:*

Be it known that I, PETER E. BIRD, of Jenkintown, in the county of Montgomery and State of Pennsylvania, have invented certain new and useful Improvements in Clothes-Line Reels; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The nature of my invention relates to clothes-line reels; and it consists in the construction and combination of parts, as will be hereinafter more fully set forth, and pointed out in the claims.

In the annexed drawings, which fully illustrate my invention, Figure 1 is a side elevation of a clothes-line reel embodying my invention. Fig. 2 is a plan view of the same. Fig. 3 is a detail view of the spring-clutch.

$a\ a$ represent two eyebolts, which are fastened to a post, A, or they may be fastened in the side of a house or in any convenient place for attaching the reel.

The frame for the reel consists of a vertical center bar, B, with top and bottom horizontal bars, $B'\ B^2$, extending from its ends and parallel to each other. This frame is, however, made of one piece of metal bent to form the three bars. On the back of the center bar, B, are attached two L-shaped hooks, $b\ b$, pointing downward, which hooks are placed in the eyebolts $a\ a$, and thus support and hold the frame in place for use, while at the same time the frame can be easily lifted off when not desired for use.

Through the ends of the arms $B'\ B^2$ are made holes for the passage of the shaft C of the reel, which shaft rotates in said arms. The reel is formed by securing two disks, D D, on the shaft C inside the frame, each of said disks being strengthened and braced by means of a central cross-bar, $D'$, fastened thereto on the outer side, and having the shaft C passing through it, as shown.

On the center of the shaft C is formed an eye or perforated lug, to which the clothes-line F is connected by means of a ring, or in any other suitable or convenient manner, as desired. Both extreme ends of the shaft C are made square, and on the lower end thereof is keyed or otherwise fastened a crank, G.

On the upper end of the shaft C is placed clutch I, which is formed with circumferential groove, and in said groove is wrapped one end of a spring or spring-arm, H, the other end of which is permanently fastened to the arm $B'$ of the reel-frame. The tendency of the spring H is to hold the clutch down in gear with correspondingly-shaped teeth $i$, formed on the upper surface of the arm $B'$, said teeth being arranged in a circle concentric with the reel-shaft.

When the reel is put up in place for use the clutch I is raised, and the clothes-line F can then be pulled and unwound from the reel, which latter then turns in its bearings. The line may then be passed in any manner desired around pulleys, or through eyebolts, or around nails in posts or fences, and its extreme end fastened in any suitable manner. The clutch I is then let down, and by means of the crank G the reel is turned so as to wind up the clothes-line until the same is perfectly taut, the clutch holding the reel from unwinding. By throwing off the line from its fastenings it can be wound up entirely on the reel, and the reel lifted out and put away.

I am aware that it is not new in clothes-line reels to provide a locking device for holding the reel from turning backward, and I do not claim such, broadly, as my invention.

Having thus fully described my invention, what I claim as new, and desire to secure by Letters Patent, is—

1. In a clothes-line reel, the clutch I, placed removably upon a square end of the reel-shaft, and actuated by the spring or spring-arm H, in combination with the teeth $i$, formed on the reel-frame, substantially as and for the purposes herein set forth.

2. The combination of the frame B $B'\ B^2$, with teeth $i$ formed on one of the arms, the square-ended shaft C, with line F connected thereto, the disks D, with strengthening-bars $D'$, the crank G, and the removable clutch I, with spring H, all substantially as and for the purposes herein set forth.

In testimony that I claim the foregoing as my own I affix my signature in presence of two witnesses.

PETER E. BIRD.

Witnesses:
 JOSEPH W. HUNTER,
 E. B. REEDER.